US012238481B2

(12) United States Patent
Pitak et al.

(10) Patent No.: US 12,238,481 B2
(45) Date of Patent: Feb. 25, 2025

(54) ACOUSTIC ACTIVITY DETECTION

(71) Applicant: INVENSENSE, INC., San Jose, CA (US)

(72) Inventors: Tomas Pitak, Bratislava (SK); Igor Mucha, Bratislava (SK); Robert Dick, Ipswich, MA (US); Michael Tuttle, Medford, MA (US)

(73) Assignee: INVENSENSE, INC., San Jose, CA (US)

( * ) Notice: Subject to any disclaimer, the term of this patent is extended or adjusted under 35 U.S.C. 154(b) by 0 days.

(21) Appl. No.: 18/359,242

(22) Filed: Jul. 26, 2023

(65) Prior Publication Data

US 2023/0370786 A1 Nov. 16, 2023

Related U.S. Application Data

(62) Division of application No. 17/396,105, filed on Aug. 6, 2021, now Pat. No. 11,758,334.

(51) Int. Cl.
*H04R 19/04* (2006.01)

(52) U.S. Cl.
CPC ....... *H04R 19/04* (2013.01); *H04R 2201/003* (2013.01)

(58) Field of Classification Search
CPC ................................................ H04R 2201/003
See application file for complete search history.

(56) References Cited

U.S. PATENT DOCUMENTS

| | | | | |
|---|---|---|---|---|
| 9,076,447 | B2 | 7/2015 | Nandy et al. | |
| 9,502,028 | B2 | 11/2016 | Nandy et al. | |
| 10,307,611 | B2 * | 6/2019 | Malchano | G02C 11/10 |
| 2012/0063632 | A1 | 3/2012 | Aoki et al. | |
| 2020/0162823 | A1 | 5/2020 | Furst et al. | |

OTHER PUBLICATIONS

International Preliminary Report on Patentability received for PCT Application Serial No. PCT/US2022/030494 dated Feb. 15, 2024, 11 pages.
International Search Report and Written Opinion received for PCT Application Serial No. PCT/US2022/030494 dated Sep. 12, 2022, 17 pages.
Yang et al., "A Sound Activity Detector Embedded Low-Power MEMS Microphone Readout Interface for Speech Recognition", IEEE, 2019, 6 pages.
Ex Parte Quayle Office Action received for U.S. Appl. No. 17/396,105, dated Mar. 31, 2023, 31 pages.
Notice of Allowance received for U.S. Appl. No. 17/396,105, dated May 5, 2023, 25 pages.

* cited by examiner

*Primary Examiner* — Mark Fischer
(74) *Attorney, Agent, or Firm* — Amin, Turocy & Watson, LLP

(57) ABSTRACT

Acoustic activity detection is provided herein. Operations of a method can include receiving an acoustic signal at a micro-electromechanical system (MEMS) microphone. Based on portions of the acoustic signal being determined to exceed a threshold signal level, output pulses are generated. Further, the method can include extracting information representative of a frequency of the acoustic signal based on respective spacing between rising edges of the output pulses.

14 Claims, 13 Drawing Sheets

1100

```
for (i = 0; 1 < PW_TOTAL+PW_TOTAL@; i++)
    {
        // smoke detector
        if (pulse_width_counts_combined[i] >= 322 && pulse_width_counts_combined[i] <= 332) smoke_tally3k += 1;
        if (pulse_width_counts_combined[i] >= 289 && pulse_width_counts_combined[i] <= 298) smoke_tally3_4k += 1;
        // 18kHz
        if (pulse_width_counts_combined[i] >= 106 && pulse_width_counts_combined[i] <= 112) high_frequency_tally108 += 1;
        if (pulse_width_counts_combined[i] >= 68 && pulse_width_counts_combined[i] <= 73) high_frequency_tally75 += 1;
    // glass break
        if (pulse_width_counts_combined[i] >= 71 && pulse_width_counts_combined[i] <= 73) glass_tally += 1;
        if (pulse_width_counts_combined[i] >= 145 && pulse_width_counts_combined[i] <= 146) glass_tally1 += 1;
        if (pulse_width_counts_combined[i] >= 181 && pulse_width_counts_combined[i] <= 183) glass_tally2 += 1;
        if (pulse_width_counts_combined[i] >= 218 && pulse_width_counts_combined[i] <= 219) glass_tally3 += 1;

smokedet_distance = dtw (smokedet, &pulse_width_counts_combined[0], ARRAY_SIZE,ARRACY_SIZE2,ARRAY_SIZE/ARRAY_SIZE2);
alexa_distance = dtw (gunshot2, &pulse_width_counts_combined[4], 112, ARRAY_SIZE2, 112/ARRAY_SIZE2);
gunshot_distance2 = dtw (gunshot2, &pulse_width_counts_combined[4],112,ARRAY_SIZE2,112/ARRAY_SIZE2);
```

FIG. 11

ACOUSTIC ACTIVITY DETECTION

CROSS REFERENCE TO RELATED APPLICATIONS

This application is a divisional of, and claims the priority of, U.S. patent application Ser. No. 17/396,105, filed Aug. 6, 2021, and entitled "ACOUSTIC ACTIVITY DETECTION," the entirety of which is expressly incorporated herein by reference.

TECHNICAL FIELD

This disclosure relates generally to the field of sensor microphones, and more specifically, to a micro-electromechanical system that detects acoustic activity.

BACKGROUND

Acoustic activity detection requires the listening device (e.g., an acoustic sensor) to react to audio wake-up activity, which can require a large amount of power, a complex system, and a large amount of processing time to analyze and quantify the audio content. For example, the acoustic sensor might only wake up a processing system based on an on/off indication that a sound pressure event has exceeded a defined level. The processing system must be fully powered up and a set of audio data is collected, processed, and further processing performed in order to analyze and quantify the audio content. Accordingly, unique challenges exist to provide an acoustic sensor that can detect and process audio wake-up activity quicker, with less power, and with less complexity.

SUMMARY

The subject application relates to a low power acoustic activity detection circuit with digitized acoustic spectral content output, a low power spectral content capture circuit, and a low power, low complexity, acoustic content classification method.

Provided herein is a method that includes receiving an acoustic signal at a micro-electromechanical system (MEMS) microphone. Based on portions of the acoustic signal being determined to exceed a threshold signal level, output pulses are generated. Further, the method includes extracting information representative of a frequency of the acoustic signal based on respective spacing between rising edges of the output pulses. The acoustic signal can be representative of audio wake up activity.

Further, the method can include analyzing and quantifying audio content based on the information representative of the frequency. Analyzing and quantifying the audio content can be performed at the MEMS microphone. Alternatively, or additionally, analyzing and quantifying the audio content can be performed at a processor coupled to the MEMS microphone. According to some implementations, the method can include outputting the information representative of the frequency to a system external to the MEMS microphone and analyzing and quantifying of the audio content can be performed by the system external to the MEMS microphone.

In accordance with some implementations, the method can include providing the output pulses at an output of the MEMS microphone. Further to these implementations, generating the output pulses can include causing the output of the MEMS microphone to change from a low state to a high state. The output of the MEMS microphone can be a wake signal.

The method can include, according to some implementations, adjusting the threshold signal level based on an average environment noise. Thus, as the environment changes (e.g., a train is passing), the threshold signal can be adjusted to take into account the change in the environment. Upon or after removal of the change (e.g., the train has moved to another location), another adjustment to the threshold signal can be performed, such as returning to a previous threshold signal or changing to another threshold signal.

According to some implementations, the method can include, based on a width of respective lengths of the output pulses that exceed the threshold signal level, extracting information representative of an amplitude of the acoustic signal. Further to these implementations, the acoustic signal can be representative of audio wake up activity, and the method can include analyzing and quantifying audio content based on the information representative of the amplitude and the information representative of the frequency. Analyzing and quantifying the audio content can be performed at the MEMS microphone. In some implementations, the information representative of the amplitude and the information representative of the frequency can be output to a system external to the MEMS microphone. Further to these implementations, analyzing and quantifying the audio content can be performed by the system external to the MEMS microphone.

Also provided herein is a method that can include obtaining audio content and performing processing on the audio content, resulting in processed audio content. Performing the processing can include tracking pulses of the audio content that exceed a defined threshold level. Further, performing the processing can include determining respective width lengths of the pulses and determining respective spacing between adjacent pulses. Performing the processing can also include outputting the processed audio content in a digitized form.

The method can also include determining a number of pulses for a period of time. The time can be a defined time period, which can be configurable. The number of pulses can be indicative of valid audio content.

According to some implementations, the respective width lengths of the pulses are indicative of an amplitude of the audio content. In some implementations, the respective spacing between adjacent pulses are indicative of a frequency of the audio content.

Performing the processing can be implemented on an electromechanical system (MEMS) microphone that obtained the audio content. Additionally, or alternatively, performing the processing can be implemented on a host processor coupled to an output of a MEMS microphone that obtained the audio content.

Also provided herein is a device that can include a micro-electromechanical system (MEMS) acoustic sensor for receiving an acoustic signal comprising an acoustic signal frequency. The device also can include circuitry for generating an output signal when the acoustic signal exceeds a threshold. The output signal can have a frequency representative of the acoustic signal frequency. The circuitry can include an analog front end block that buffers an electronic signal received from the MEMS acoustic sensor, resulting in a buffered signal. The circuitry also can include a programmable gain amplifier that amplifies the buffered signal, resulting in an amplified buffered signal. Further, the circuitry can include a comparator that compares the amplified buffered signal to a defined reference voltage. The output signal is generated based on the amplified buffered signal satisfying the defined reference voltage.

BRIEF DESCRIPTION OF THE DRAWINGS

Various non-limiting embodiments are further described with reference to the accompanying drawings in which:

FIG. 11 illustrates an example, non-limiting, algorithm that can be utilized with the disclosed aspects;

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments.

Acoustic sensing is used to access an environment for an event of interest (e.g., activation of a smoke detector, glass breaking, gun shot, or another noise). For example, acoustic sensing can be utilized for security purposes or other purposes for which it is desirable to monitor an environment for one or more events of interest. In most implementations, acoustic events that are of interest occur infrequently. Thus, existing systems employ an always-on (e.g., always listening) acoustic wakeup detector for detection of one-time events (e.g., glass breaking) and/or for detection of events that are of critical importance. Thus, existing systems, for which it is necessary to react to audio wake-up activity, require a large (sometimes significant) amount of power, are complex, and require time to analyze and quantify the audio content.

Existing acoustic activity detection systems or circuits can include a microphone having an embedded acoustic activity detect circuit and a voice processor, which can include embedded Digital Signal Processing (DSP) functionality. The operations of such systems allow only for wake up of a system based on an "on" indication and/or an "off" indication that a sound pressure event has exceeded a specified decibel Sound Pressure Level (dB SPL). Once this indication has occurred, the system is fully powered up and a set of audio data is collected and processed to extract frequency and amplitude details. This data must then be analyzed to determine next steps. For example, the data is processed by a voice processor or other type of acoustic analyzer and a Fast Fourier Transform (FFT), for example, is executed on the content, which also goes through a series of algorithms to classify what event has occurred.

The one or more embodiments provided herein can facilitate a low power acoustic activity detection circuit with digitized acoustic spectral content output. Also provided is a low power spectral content capture circuit and classification method. Further, provided herein is a low power, low complexity, acoustic content classification method. The disclosed embodiments provide a low power, low complexity digitized acoustic spectral content output at the hardware level.

Figure 1:
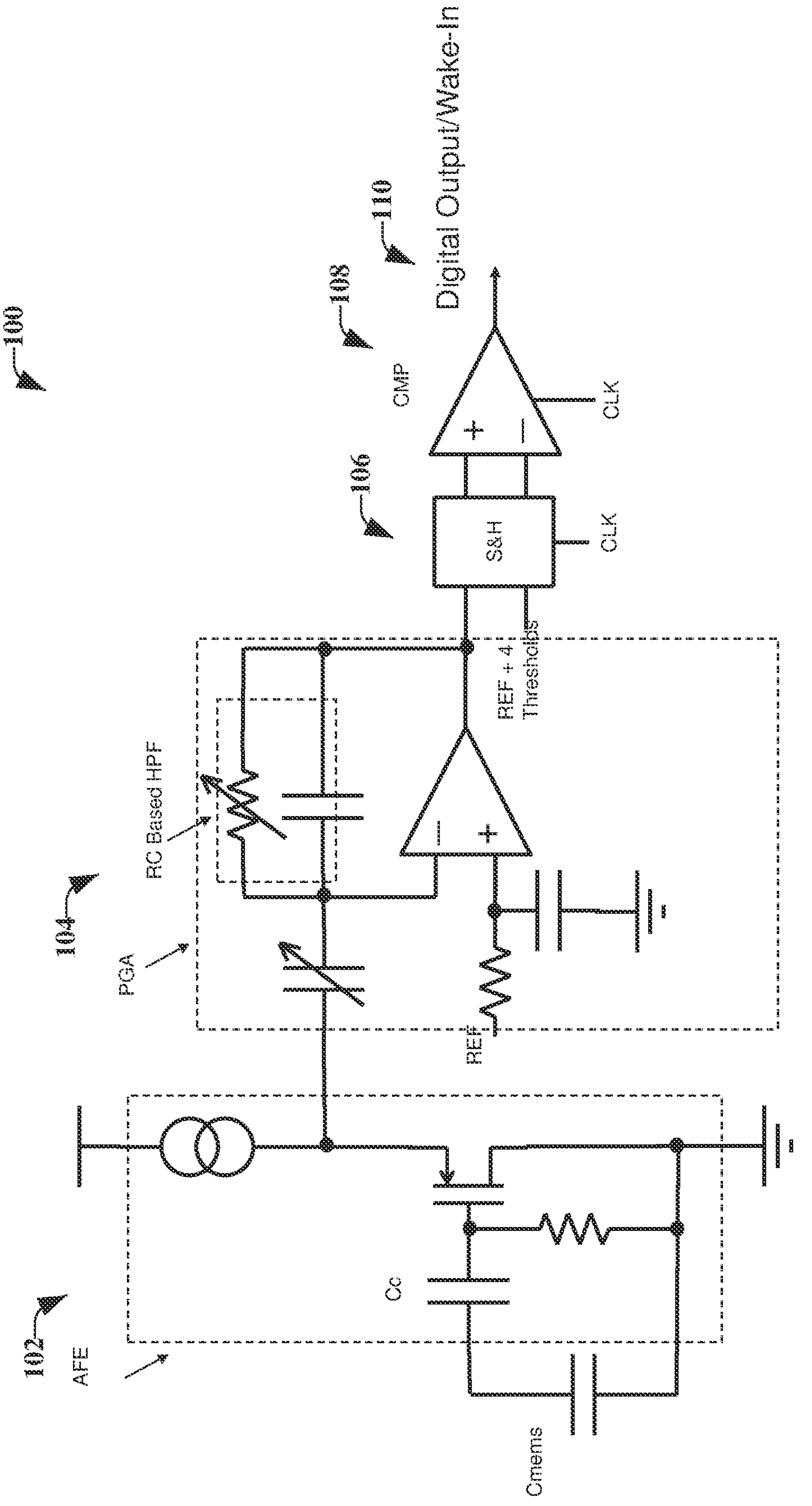
FIG. 1 illustrates an example, non-limiting, acoustic activity detection circuit in accordance with one or more embodiments described herein.

With reference initially to FIG. 1, illustrated is an example, non-limiting, acoustic activity detection circuit 100 in accordance with one or more embodiments described herein. Acoustic activity detection, as provided herein, is an ultra-low power edge processing feature in which a microphone (e.g., a MEMS microphone) monitors an environment for acoustic activity (e.g., an event of interest) and wakes up a System on Chip (SoC) or an application processor when acoustic activity is detected. The disclosed embodiments can reduce and/or mitigate the amount of power and/or the amount of time necessary for obtaining results by an order of magnitude (as compared to existing systems). Accordingly, the disclosed embodiments can enable smart sensors, home automation, security systems, and other smart products that can benefit from low power acoustic activity detection and classification. The reduced and/or mitigated amount of power and reduced processing can also extend battery life, sometimes significantly as compared to existing systems.

The acoustic activity detection circuit 100 includes an analog front end block or Analog Front End circuit (AFE circuit 102), a Programmable Gain Amplifier (PGA 104), a sample and hold block 106, and a comparator (CMP 108).

AFE circuit 102 buffers the analog signal. According to some implementations, the AFE circuit 102 can include an impedance converter (e.g., a source follower buffer). The buffered signal is amplified using the PGA 104. The sample and hold block 106 (e.g., a sample and hold circuit) samples the buffered signal, and holds its value at a constant level for a specified period of time. To sample the buffered signal, the sample and hold block 106 captures or records the value. It is noted that the buffered signal is continuously changing, therefore, the sample and hold block 106 holds the value by locking or freezing the value for the specified period of time.

The amplified buffered signal is compared using the CMP 108. According to some implementations, the CMP 108 can include a programmable reference voltage. The gain of the PGA 104 and the reference voltage value of the CMP 108 correlate to a defined acoustic dB SPL threshold level selected for detection of a specified or defined acoustic input.

If a signal at the output of PGA 104 exceeds the selected reference voltage on the CMP 108, the state of the CMP 108 output is changed from low to high. The state remains high until the voltage at the PGA 104 does not return below the CMP 108 reference voltage level. By way of example and not limitation, the reference voltage level (REF) in FIG. 1 is 800 mV common mode reference voltage for amplifier. Further, REF+4 Thresholds is input voltage used by the CMP 108, it adjusts with dBSPL threshold settings (e.g., 850 mV, 900 mV and 950 mV).

The pulse output of the CMP 108 is unique in that the pulse period corresponds to the frequency of the audio content that generated the pulse output. Further, the width of the pulse high time is proportional to the amplitude of the input audio content. This output is provided as a wake signal (e.g., to digital output/wake-in signal 110), as will be discussed in further detail below. In some embodiments, the wake-in signal 110 is provided at the output pin of the device.

The output of the microphone wake signal is connected to a general purpose input/output (GPIO) input on a microprocessor, codec, or voice processing chip. Internal to this device, which is running in a low power sleep or hibernate mode, one or more hardware based counters, or an equivalent software loop is used to count the wake pulse high time, as well as the time between successive wake pulses. This data is collected for sequential sets of wake pulses.

Internal to the microprocessor, codec, or voice processor, after the set of wake pulse high times and period values have been collected, while still in a low power mode the pulse periods and/or the pulse widths are analyzed. The number of pulses at defined frequencies and/or above defined amplitudes are counted and classified based on the specific accumulated frequency content, or based on the sequential ordering of frequencies and/or frequencies and amplitudes. The algorithms can include a summing if/then loop and/or a sequential set of “IF” statements. Thus, the disclosed embodiments are capable of detecting specific acoustic activity events such as smoke detectors, car alarms, glass breaking and is also capable of wake word classification, as will be discussed in further detail below.

According to some implementations, the gain of the PGA 104 and the CMP 108 reference voltage can be dynamically modified if detection of a signal above average background environmental noise levels is required. For example, if the background noise is detected (e.g., machinery, a train, and so on), the reference voltage can be dynamically adjusted and, after the background noise is removed (e.g., the machinery is turned off, the train has passed the area), the reference voltage can be dynamically adjusted again to the previous reference voltage or to another reference voltage.

At a hardware level, the disclosed embodiments make available, via a hardware pin, a digitized version of the frequency content output of audio activity that is occurring. This can be performed at very low power. The circuit is effectively pulling the audio content in, performing a process (which can be equivalent to an FFT process) on the audio content, and outputting the signal in a digitized form to an external hardware pin. This bypasses the need for a voice processor to pull the data in (in real time) at high power and run an FFT on it before processing could be performed, as is the case with existing systems.

Figure 2:
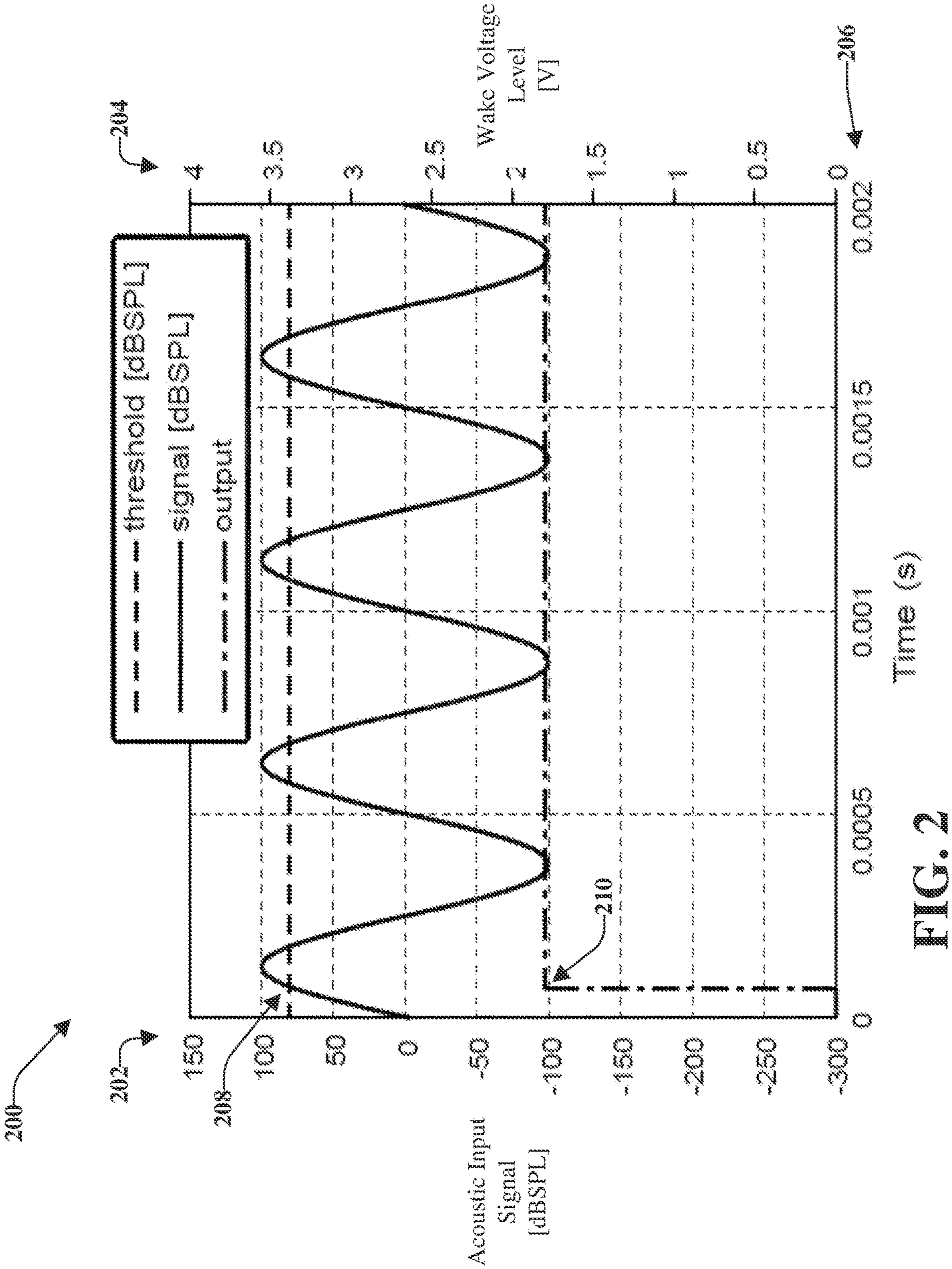
FIG. 2 illustrates a graph of a standard implementation of an acoustic activity detection circuit with an acoustic input signal and a wake voltage level plotted over time.

FIG. 2 illustrates a graph 200 of a standard implementation of an acoustic activity detection circuit with an acoustic input signal and a wake voltage level plotted over time. Represented on the left vertical axis 202 is the acoustic input signal, expressed in dB SPL. Represented on the right vertical axis 204 is the wake voltage level, expressed in voltage (V). Further, time 206 is represented on the horizontal axis. The threshold level, in dB SPL, is represented by the dashed line. The received acoustic signal is indicated by the waveform. Further, the output signal is indicated by the line with alternating dashes and dots.

As indicated at 208, the received acoustic signal has exceeded the threshold level for a first time. Based on detection of the received acoustic signal exceeding the threshold, the output signal (e.g., a wake signal) goes high, as indicated at 210. The output signal stays high, even though the received acoustic signal does not stay above the threshold level. Thus, at a first time when the threshold level is exceeded, the wake signal goes high. Thereafter, the register is not cleared, and the wake signal remains in a high state.

Figure 3:
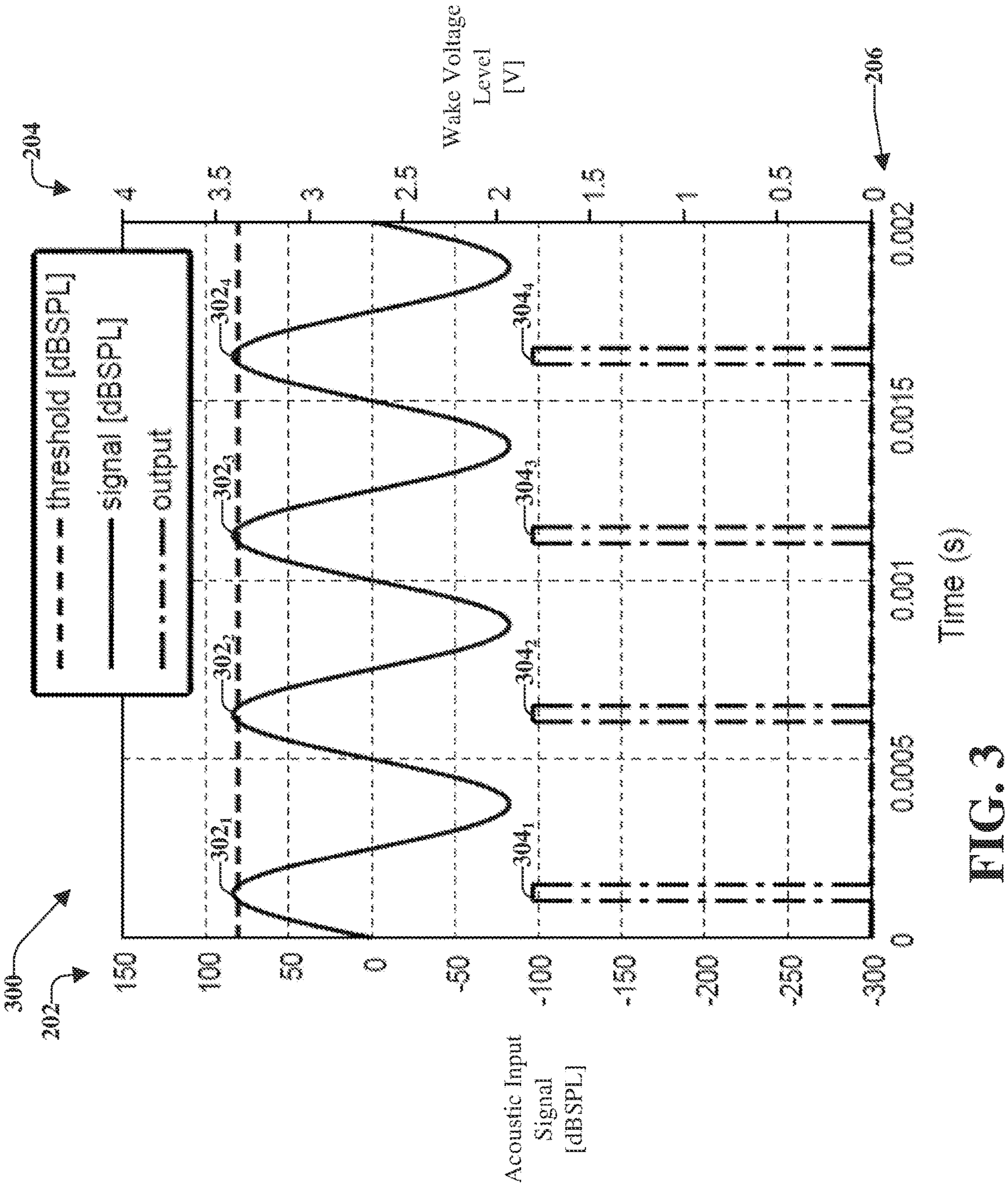
FIG. 3 illustrates a graph of an implementation of an acoustic activity detection circuit with the acoustic input signal and the wake voltage level plotted over time in accordance with one or more embodiments described herein.

FIG. 3 illustrates a graph 300 of an implementation of an acoustic activity detection circuit with the acoustic input signal and the wake voltage level plotted over time in accordance with one or more embodiments described herein. Repetitive description of like elements employed in other embodiments described herein is omitted for sake of brevity.

The threshold level, in dB SPL, is represented by the dashed line. The received acoustic signal is indicated by the waveform. Further, the output signal is indicated by the line with alternating dashes and dots. The output signal is the output of the acoustic activity detection circuit 100 of FIG. 1 as indicated by the notation to digital output/wake-in signal 110, which provides the frequency content in a digitized format at a hardware level. Thus, each time the threshold level is exceeded (e.g., or satisfied), the resulting signal is output as a pulse of the wake signal. The time(s) between the rising edges of the wake signal are utilized in order to extract information about the frequency of the acoustic signal.

As illustrated, utilizing the disclosed embodiments, when the received acoustic signal exceeds the threshold, the output signal (e.g., wake signal) goes high only for the duration of time during which the received acoustic signal is above the threshold level (e.g., only some frequency information related to the activity is output). For example, the received acoustic signal exceeds the threshold at $\mathbf{302}_1$, $\mathbf{302}_2$, $\mathbf{302}_3$, and $\mathbf{302}_4$. Corresponding to the times when the received acoustic signal is high, the wake signal is high, as indicated at $\mathbf{304}_1$, $\mathbf{304}_2$, $\mathbf{304}_3$, and $\mathbf{304}_4$.

According to some implementations, the acoustic signal range can cover voice through mid and high frequencies (e.g., around 0 kilohertz (kHz) to about 18 kHz), and includes low frequency ultrasound (about 18 kHz to around 80 kHz). Thus, at $302_1$ the received acoustic signal exceeds the threshold level and, as indicated at $304_1$ the output signal (e.g., wake signal) goes high only for the duration (e.g., width) of the portion of the received acoustic signal that exceeds the threshold level. Thereafter, the output signal (e.g., wake signal) resets until a next time the received acoustic signal exceeds the threshold level, as indicated at $302_2$. At this time, the output signal again goes high, as indicated at $304_2$, only during the time when the received output signal exceeds the threshold level. Thereafter, the output signal resets, until a subsequent time when the received acoustic signal exceeds the threshold level (e.g., at $302_3$ and so on).

Figure 4:
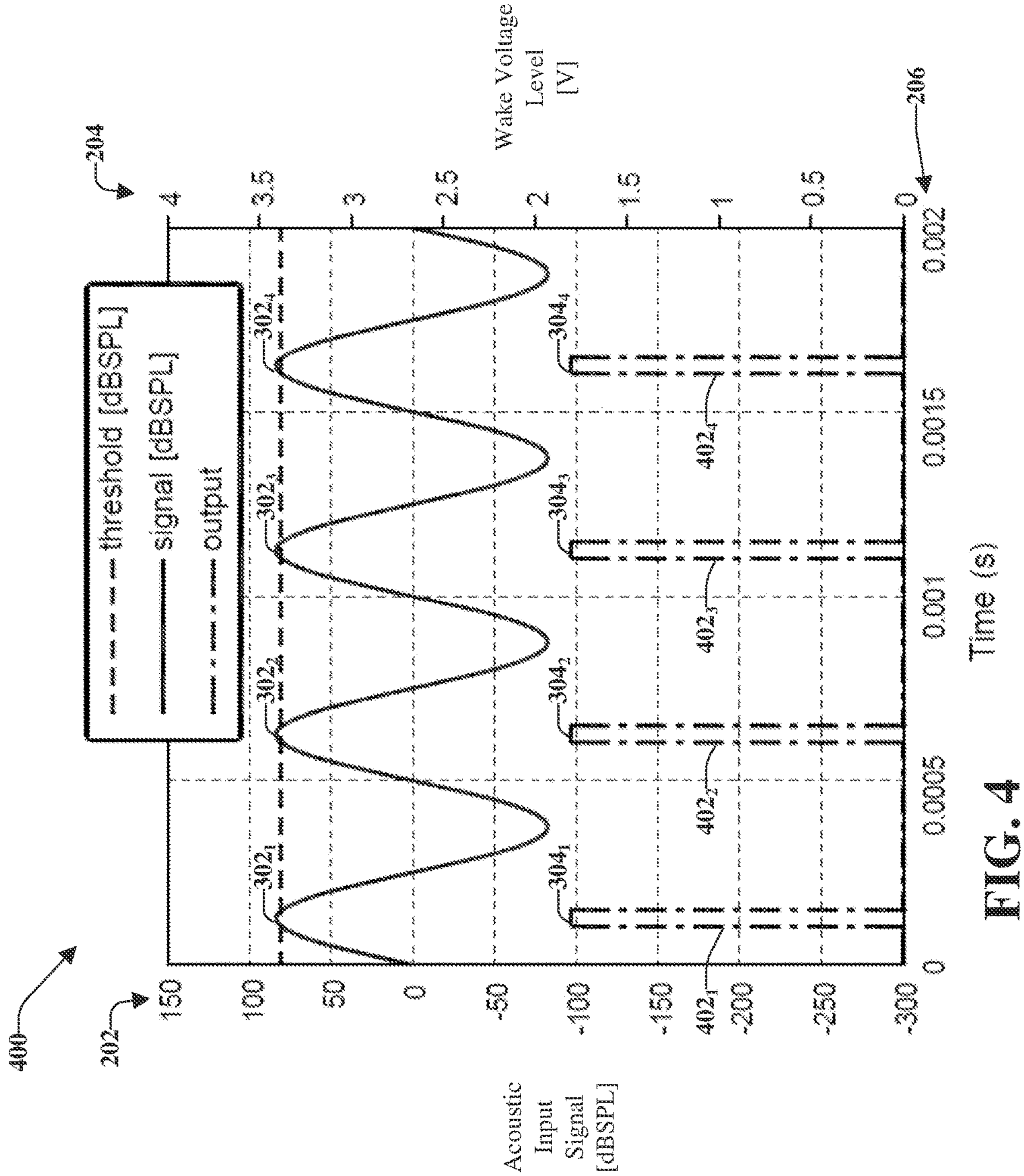
FIG. 4 illustrates a graph of an estimation of acoustic signal frequency with the acoustic input signal and the wake voltage level plotted over time in accordance with one or more embodiments described herein.

FIG. 4 illustrates a graph 400 of an estimation of acoustic signal frequency with the acoustic input signal and the wake voltage level plotted over time in accordance with one or more embodiments described herein. Repetitive description of like elements employed in other embodiments described herein is omitted for sake of brevity.

For this example, the signal frequency is 2 kHz, the signal amplitude is 83 dB SPL, and the threshold setting (e.g., the threshold level) of the acoustic activity detector (e.g., the acoustic activity detection circuit) is 80 dB SPL, as indicated by the dashed line. As discussed with respect to FIG. 3, upon or after the input signal exceeds the selected threshold level (e.g., as indicated at $302_1$, $302_2$, $302_3$, and $302_4$), the wake signal goes high (e.g., as indicated at $304_1$, $304_2$, $304_3$, and $304_4$). The time elapsed between two following rising edges (e.g., edges $402_1$, $402_2$, $402_3$, and/or $402_4$) on the wake signal can be used to calculate the frequency of the acoustic signal. In this manner, the MEMs microphone (e.g., the acoustic activity detection circuit 100 and other embodiments) can provide information about frequency and amplitude of dominant input signal at low power. For example, the full microphone can consume (e.g., in acoustic activity detection algorithm (AADA) mode) around 20 microamp (around 20 μA) or about 36 microwatts (about 36 u W).

It is noted that some figures illustrate a waveform that has a same period. However, the disclosed embodiments are not limited to this implementation, instead, the frequency of the received acoustic signal can change or be different than one another (or two or more can be the same or similar). Further, the spacing between the pulses can change or be different than one another (or two or more can be the same or similar). The corresponding output signal will change accordingly.

Figure 5:
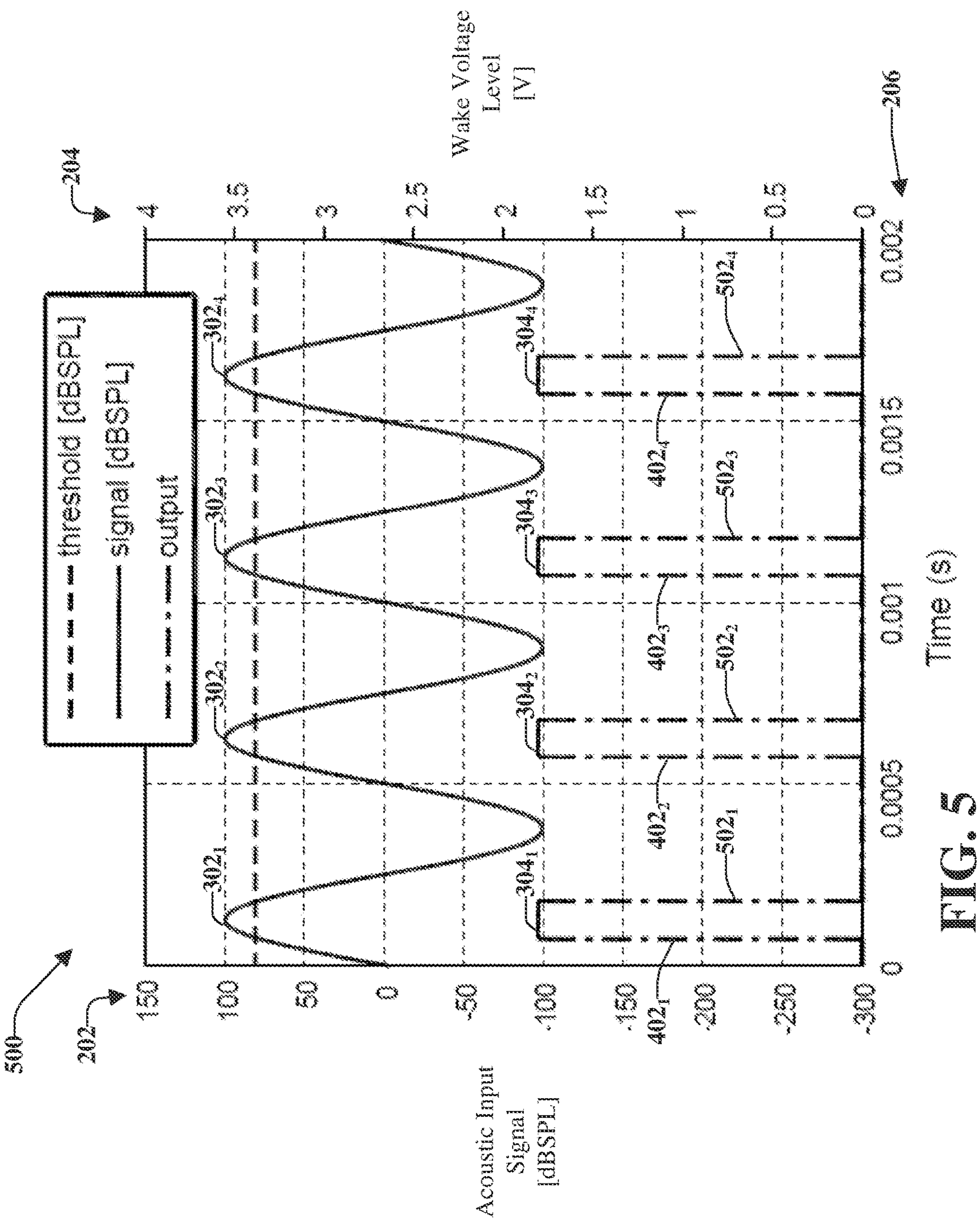
FIG. 5 illustrates a graph of an estimation of acoustic signal amplitude with the acoustic input signal and the wake voltage level plotted over time in accordance with one or more embodiments described herein.

FIG. 5 illustrates a graph 500 of an estimation of acoustic signal amplitude with the acoustic input signal and the wake voltage level plotted over time in accordance with one or more embodiments described herein. Repetitive description of like elements employed in other embodiments described herein is omitted for sake of brevity.

For this example, the signal frequency is 2 kHz, the signal amplitude is 100 dB SPL, and the threshold setting (e.g., threshold level) of the acoustic activity detector (e.g., the acoustic activity detection circuit) is 80 dB SPL. As discussed above, when the input signal exceeds the selected threshold level (e.g., as indicated at $302_1$, $302_2$, $302_3$, and $302_4$), the wake signal goes high (e.g., as indicated at $304_1$, $304_2$, $304_3$, and $304_4$). The time elapsed between the rising edges (e.g., edges $402_1$, $402_2$, $402_3$, and/or $402_4$) and the falling edges (e.g., edges $502_1$, $502_2$, $502_3$, and/or $502_4$) on the wake signal and information about the signal frequency can be used to estimate if the acoustic signal is comparable or significantly larger than a selected threshold. This information can be used by an application processor to adjust the threshold level on the microphone, for example.

Figure 6:
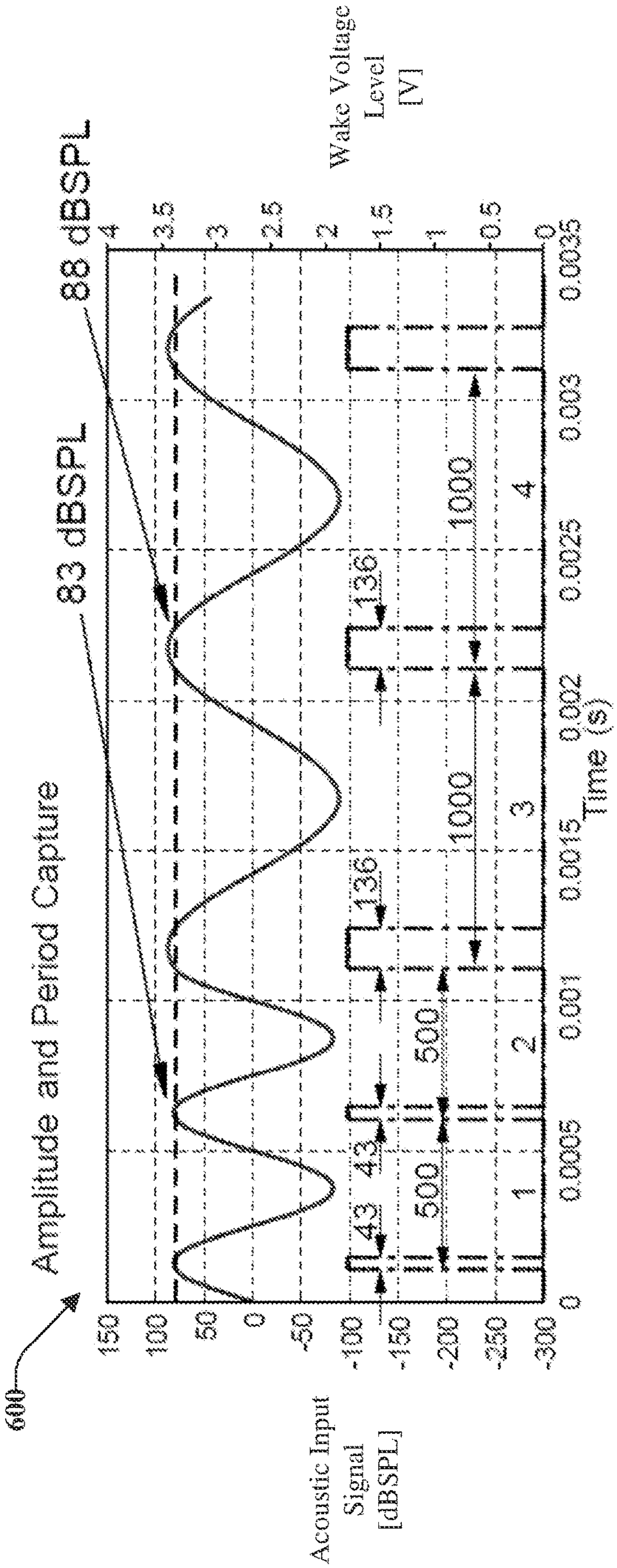
FIG. 6 illustrates a graph of an amplitude and period capture of an acoustic signal with the acoustic input signal and the wake voltage level plotted over time in accordance with one or more embodiments described herein.

FIG. 6 illustrates a graph 600 of an amplitude and period capture of an acoustic signal with the acoustic input signal and the wake voltage level plotted over time in accordance with one or more embodiments described herein. Repetitive description of like elements employed in other embodiments described herein is omitted for sake of brevity.

Figure 7:
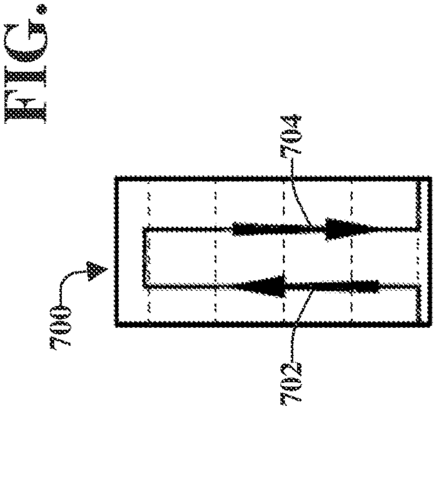
FIG. 7 illustrates an amplitude inverse stochastic resonance for the received acoustic signal of FIG. 6.

For this example, the threshold setting (e.g., threshold level) of the acoustic activity detector (e.g., the acoustic activity detection circuit) is 83 dB SPL and the high value of the received acoustic signal is 88 dB SPL. With reference also to FIG. 7, illustrated is a waveform of CMP output signal 110 used to extract information about relative amplitude of signal 700 for the received acoustic signal of FIG. 6. The interrupt on the rising edge 702 of the pulse and the falling edge 704 of the pulse is used to obtain the count value from the counter for the time between interrupts.

Figure 8:
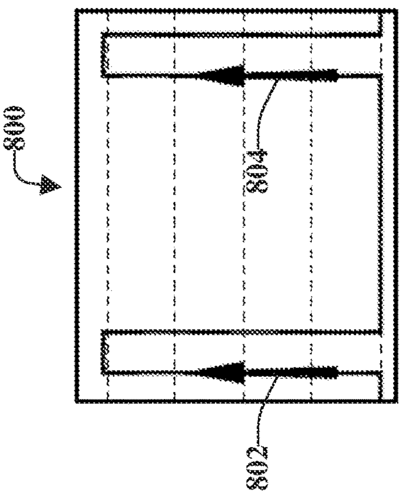
FIG. 8 illustrates a period inverse stochastic resonance for the received acoustic signal of FIG. 6.

With reference also to FIG. 8, illustrated is a waveform of CMP output signal 110 used to extract information about frequency of signal 800 for the received acoustic signal of FIG. 6. The interrupt on the rising edge 802 of the pulse and the next rising edge 804 of the pulse can be used to obtain the count value from the counter for the time between two interrupts.

Figure 9:
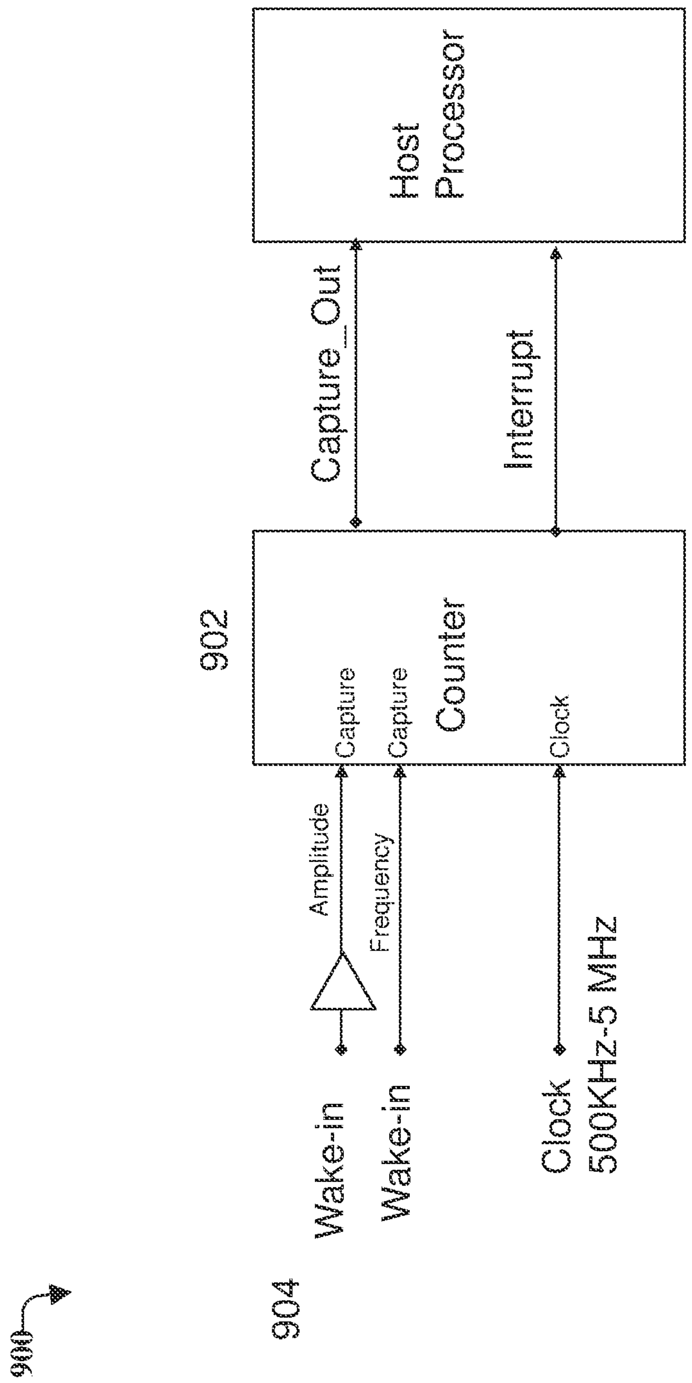
FIG. 9 illustrates a block diagram of a microprocessor that utilizes one counter for quantifying data in accordance with one or more embodiments described herein.

FIG. 9 illustrates an example, non-limiting, block diagram of a microprocessor 900 that utilizes a counter for quantifying data in accordance with one or more embodiments described herein. The block diagram of FIG. 9 illustrates a timer counter 902, however, more than one timer counter can be utilized with the disclosed aspects. The timer counter 902 is utilized to count the time between the pulses and/or the time that the pulse is high.

Based on detection of the received acoustic signal exceeding the threshold, the output signal (e.g., a wake-in signal 904) goes high. The amplitude can be determined by obtaining the count value from the counter at Capture_out for the time between two interrupts, as discussed with respect to FIG. 7. The frequency can be determined by obtaining the count value from the counter at Capture-out for the time between two interrupts, as discussed with respect to FIG. 8. Table 1 below provides example, non-limiting, calculated outputs derived from FIG. 6.

TABLE 1

| Count | Amplitude Count in micro seconds (μS) | Period count in μS |
|---|---|---|
| 1 | 43 | 500 |
| 2 | 43 | 500 |
| 3 | 136 | 1000 |
| 4 | 136 | 1000 |

With continuing reference to FIG. 9, an output of the microphone wake-in signal 904 is connected a general purpose input/output (GPIO) input on a microprocessor, codec, or voice processing chip. For example, the wake-in signal 904 is connected to an input (capture 916) of the counter 902. Internal to this device, which is running in a low power sleep or hibernate mode, one or two hardware based counters (e.g., the timer counter 902) or an equivalent software loop is utilized to count the wake pulse high time, as well as the time between successive wake pulses. This data is collected for sequential sets of wake pulses as discussed herein.

Figure 10:
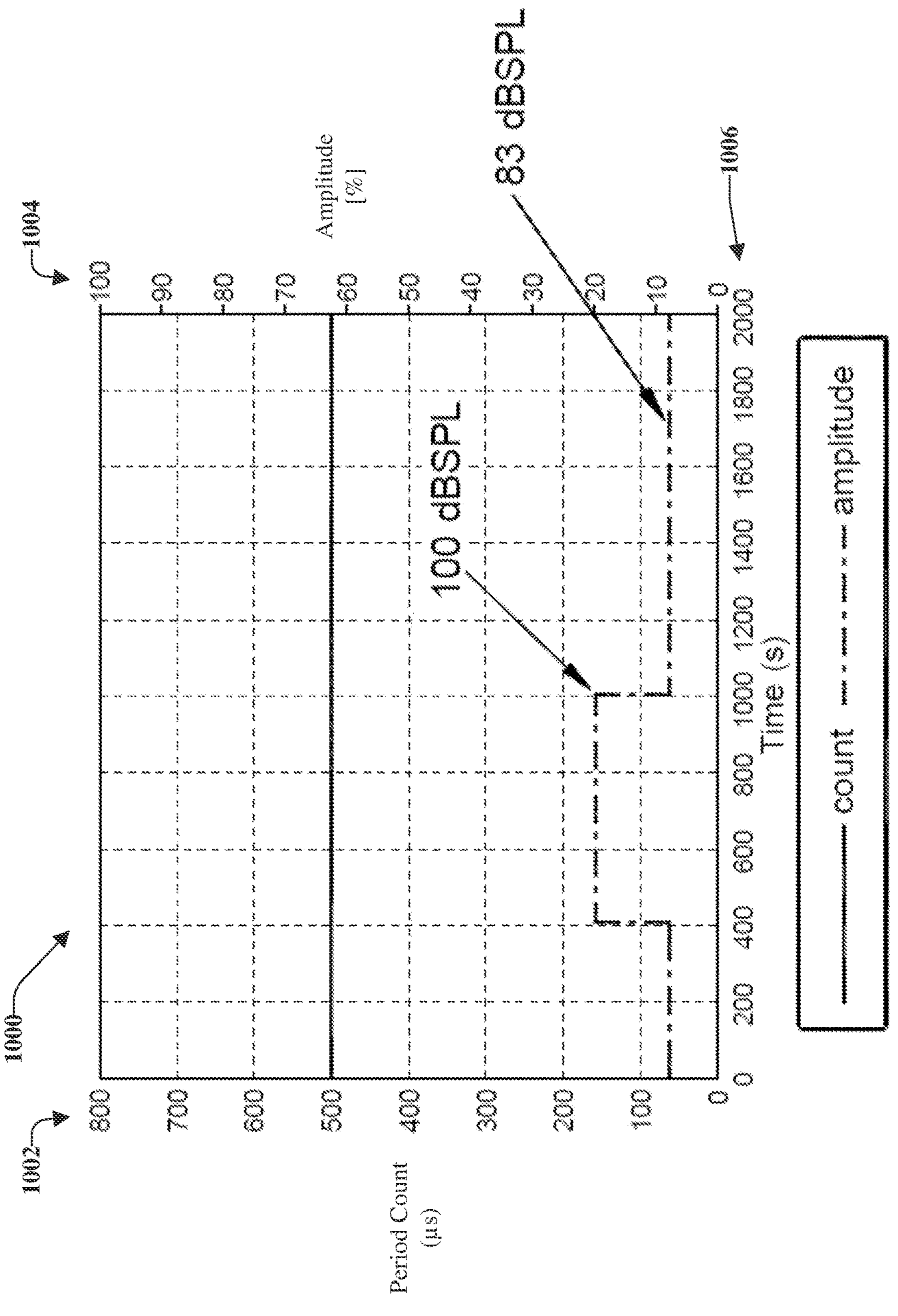
FIG. 10 illustrates an example, non-limiting, graph of a further amplitude and period capture of an acoustic signal with a period count and amplitude plotted over time in accordance with one or more embodiments described herein.

FIG. 10 illustrates an example, non-limiting, graph 1000 of a further amplitude and period capture of an acoustic signal with a period count and amplitude plotted over time in accordance with one or more embodiments described herein. Represented on the left vertical axis 1002 is a period count, expressed in micro seconds (μS). Represented on the right vertical axis 1004 is amplitude expressed in percentage (%). Further, time 1006 is represented on the horizontal axis. The period count is represented by the solid line. The amplitude is indicated by the line with alternating dashes and dots. Table 2 below illustrates example, non-limiting, calculated outputs for FIG. 10.

TABLE 2

| Pulse | Amplitude | Period in μs |
|---|---|---|
| 1 | 8 | 500 |
| : | 8 | 500 |
| 399 | 8 | 500 |
| 400 | 20 | 500 |
| : | 20 | 500 |
| 1000 | 20 | 500 |

Thus, for this example, from pulse number 1 through pulse number 399, the amplitude (e.g., the width of the high time of the pulse) is a value of 8 and the period (e.g., the overall time between the ridge edges of the pulses) is 500 μS. Further to this example, from pulse number 400 through pulse number 1000, the amplitude is 20 and the period remains the same at 500 μS. It is noted that these values, as well as other values discussed herein, are for example purposes only and the disclosed embodiments are not limited to these values.

Various frequency density and Dynamic Time Warping (DTW) algorithms can be utilized with the disclosed aspects. FIG. 11 illustrates an example, non-limiting, algorithm 1100 that can be utilized with the disclosed aspects. The example, non-limiting, algorithm 1100 searches for frequency density or specific frequency events occurring in time.

Methods that can be implemented in accordance with the disclosed subject matter, will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 12:
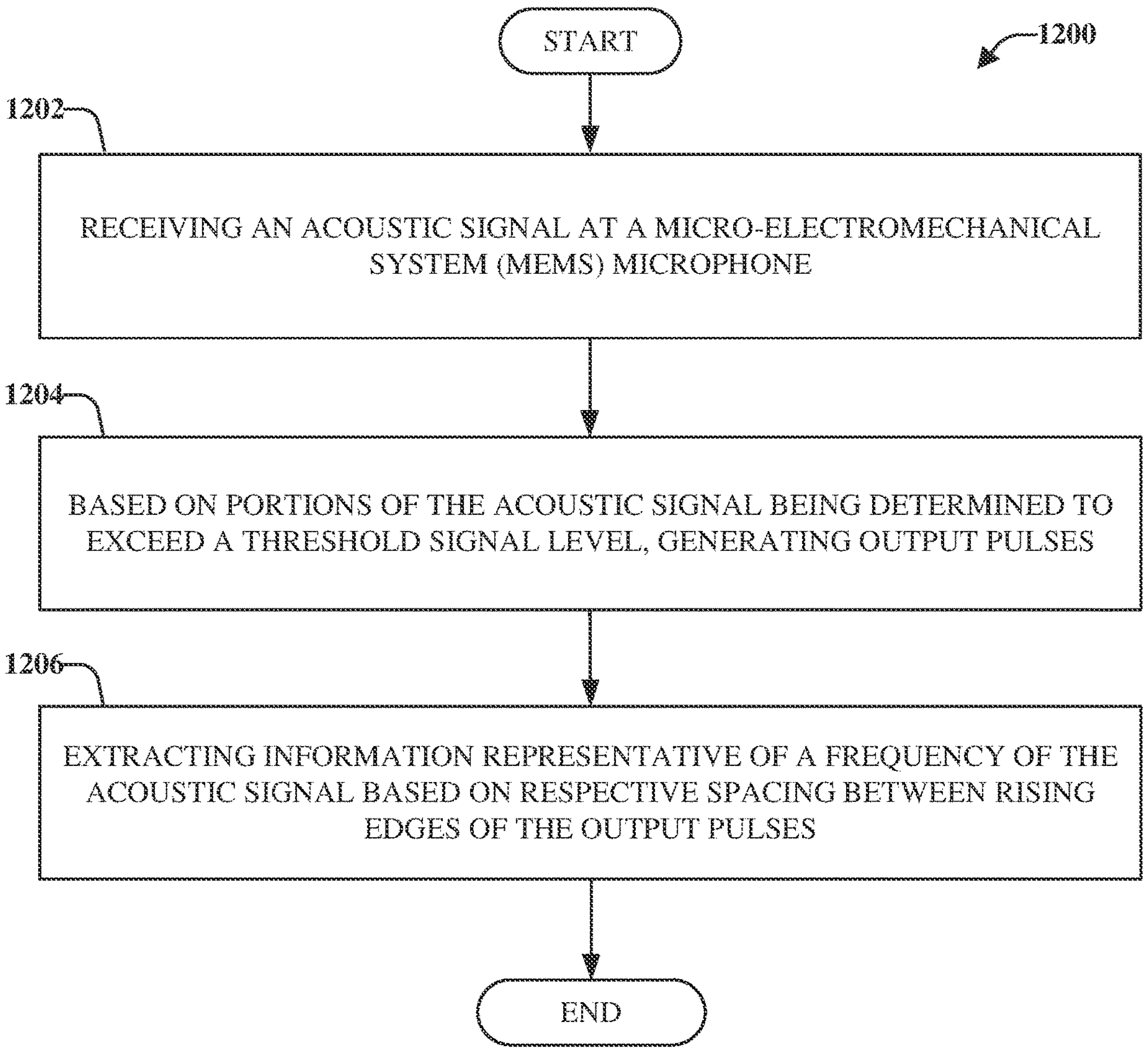
FIG. 12 illustrates a flow diagram of an example, non-limiting, computer-implemented method for acoustic activity detection in accordance with one or more embodiments described herein.

FIG. 12 illustrates a flow diagram of an example, non-limiting, computer-implemented method 1200 for acoustic activity detection in accordance with one or more embodiments described herein. The computer-implemented method 1200 can be implemented by a circuit (e.g., the acoustic activity detection circuit 100), by a MEMS sensor, a MEMS microphone, a system including a processor, and so on.

At 1202 of the computer-implemented method 1200, an acoustic signal can be received at a micro-electromechanical system (MEMS) microphone. The acoustic signal can be representative of audio wake up activity.

Based on portions of the acoustic signal being determined to exceed a threshold signal level, at 1204 output pulses are generated. Information representative of a frequency of the acoustic signal is extracted, at 1206. The information can be extracted based on respective spacing between rising edges of the output pulses.

According to some implementations, the method includes analyzing and quantifying audio content based on the information representative of the frequency. The analyzing and quantifying of the audio content can be performed at the MEMS microphone. Alternatively, the analyzing and quantifying the audio content is performed at a processor coupled to the MEMS microphone. In an example, the processor could be a separate chip. According to some implementations, the information representative of the frequency can output to a system external to the MEMS microphone. Further, analyzing and quantifying of the audio content can be performed by the system external to the MEMS microphone.

In accordance with some implementations, the computer-implemented method 1200 can include providing the output pulses at the output of the MEMS microphone. Further to these implementations, generating the output pulses, at 1206, can include causing the output of the microphone to change from a low state to a high state. The output of the MEMS microphone can be a wake signal.

Figure 13:
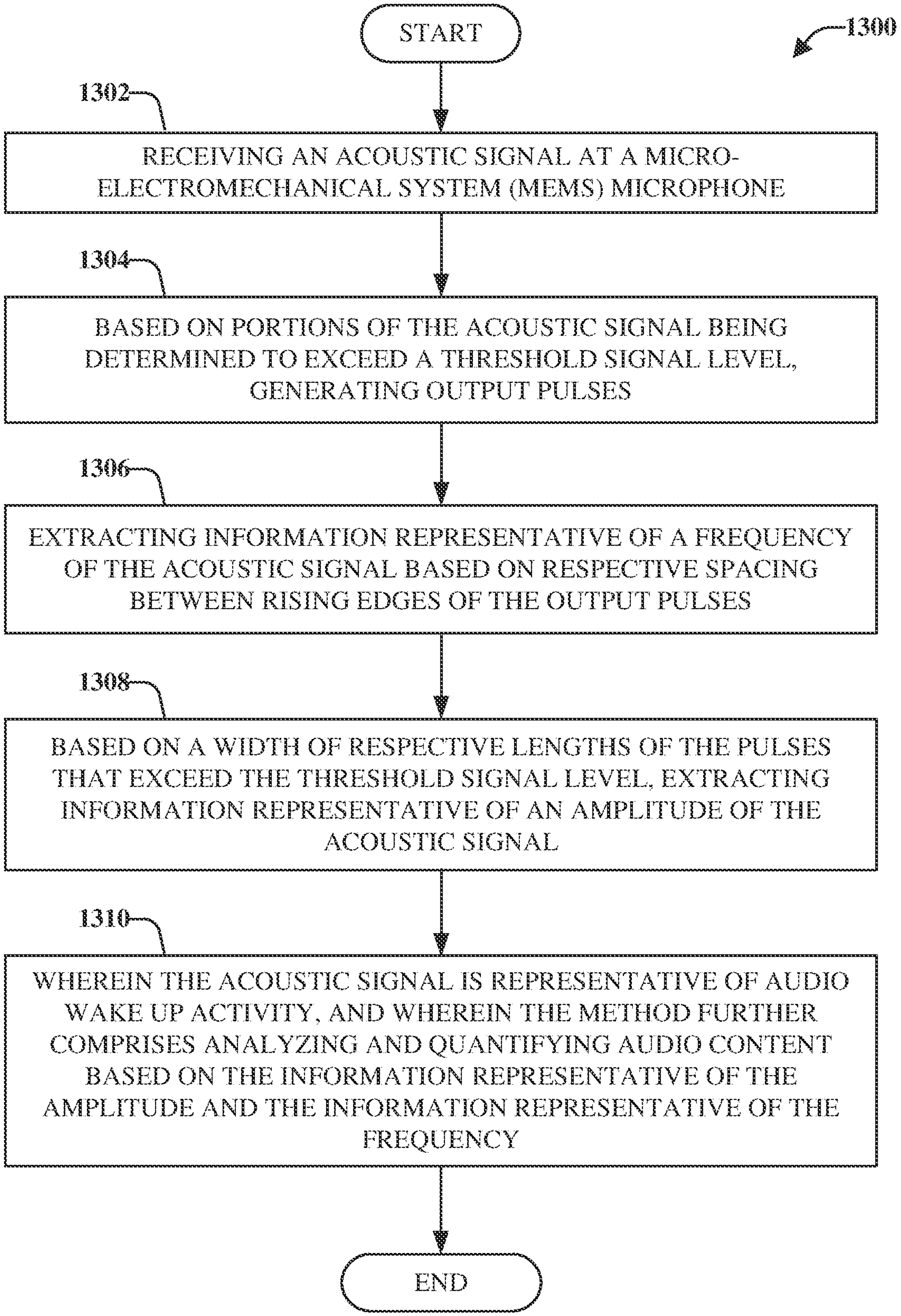
FIG. 13 illustrates a flow diagram of another example, non-limiting, computer-implemented method for acoustic activity detection in accordance with one or more embodiments described herein.

FIG. 13 illustrates a flow diagram of another example, non-limiting, computer-implemented method 1300 for acoustic activity detection in accordance with one or more embodiments described herein. The computer-implemented method 1300 can be implemented by a circuit (e.g., the acoustic activity detection circuit 100), by a MEMS sensor, a MEMS microphone, a system including a processor, and so on.

At 1302, an acoustic signal is received at a MEMS microphone. Based on portions of the acoustic signal being determined to exceed a threshold signal level, at 1304, one or more output pulses are generated. Further, at 1306, information representative of a frequency of the acoustic signal can be extracted. The extraction can be based on respective spacing between rising edges of the output pulses.

Based on a width of respective lengths of the pulses that exceed the threshold signal level, at 1308, the computer-implemented method 1300 extracts information representative of an amplitude of the acoustic signal. The acoustic signal can be representative of audio wake up activity. Optionally, the computer-implemented method 1300 can include, at 1310, analyzing and quantifying audio content based on the information representative of the amplitude and the information representative of the frequency.

The analyzing and quantifying the audio content can be performed at the MEMS microphone. Alternatively, information representative of the amplitude and the information representative of the frequency can be output to a system external to the MEMS microphone. Further to this alternative implementation, the analyzing and quantifying of the audio content can be performed by the system external to the MEMS microphone.

Figure 14:
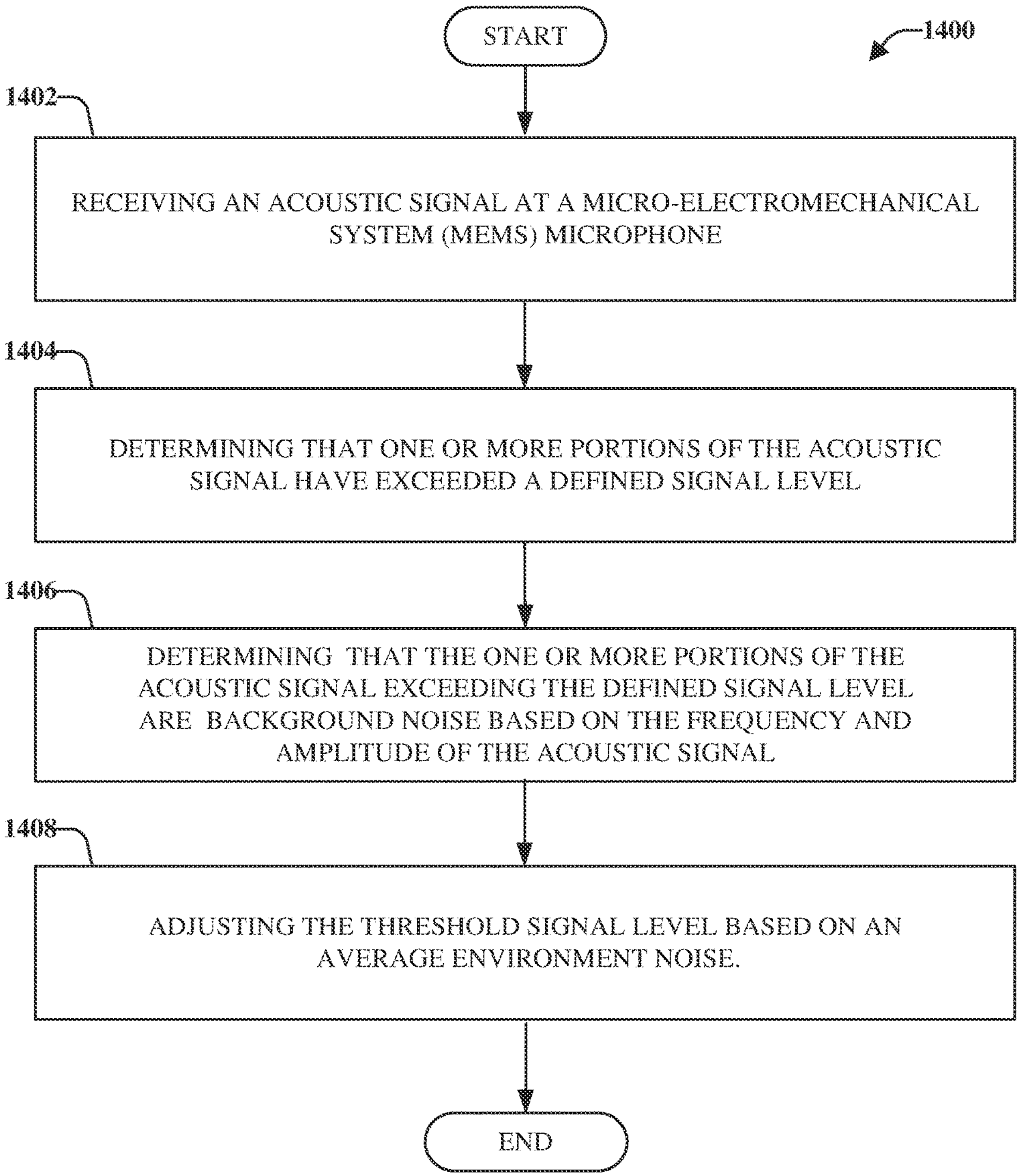
FIG. 14 illustrates a flow diagram of another example, non-limiting, computer-implemented method for dynamically adjusting a threshold signal during acoustic activity detection in accordance with one or more embodiments described herein.

FIG. 14 illustrates a flow diagram of another example, non-limiting, computer-implemented method 1400 for dynamically adjusting a threshold signal during acoustic activity detection in accordance with one or more embodiments described herein. The computer-implemented method 1400 can be implemented by a circuit (e.g., the acoustic activity detection circuit 100), by a MEMS sensor, a MEMS microphone, a system including a processor, and so on.

At 1402, an acoustic signal is received at a MEMS microphone. At 1404, it is determined that one or more portions of the acoustic signal has exceeded a defined signal level. At 1406, the one or more portions of the acoustic signal exceeding the defined signal level are determined to be background noise or average environment noise based on the frequency and amplitude of the acoustic signal. The background noise or average environment noise can be a temporary condition or a permanent condition. Examples of such conditions include a lawn mower, farm equipment, a train, machinery, and so on. Therefore, at 1408, the threshold signal level can be adjusted based on an average environment noise. Thus, the threshold signal level (e.g., reference voltage) can be dynamically modified if detection of a signal above average background environmental noise levels is required, according to some implementations.

According to some implementations, the threshold signal level is adjusted manually or is a predefined setting. However, as discussed herein and with respect to FIG. 14, in some implementations, an average environment noise can be utilized to dynamically adjust the threshold signal level. Thus, the circuit itself can adjust the threshold to follow a defined time interval (e.g., 1 second, 3 seconds, and so on) of average noise in the environment. This means that when an audio signal is received into the microphone, (e.g., the signal represented by the waveform in FIGS. 3, 4, 5, and 6), and is determined to exceed the threshold level (e.g., the dashed lines in FIGS. 3, 4, 5, and 6), the circuit activates and generates the output (e.g., the lines that are dashed and dotted in FIGS. 3, 4, 5, and 6). For example, imagine if a train is going by or some loud event is occurring. Instead of providing output for the entire duration of the train or other loud event, the acoustic activity detection circuit 100 would automatically raise the threshold level in order to eliminate or mitigate the occurrence of the train or loud event from activating the circuit and generating the output. This can also mitigate overloading the circuit or producing long pulses that do not provide useful information.

Figure 15:
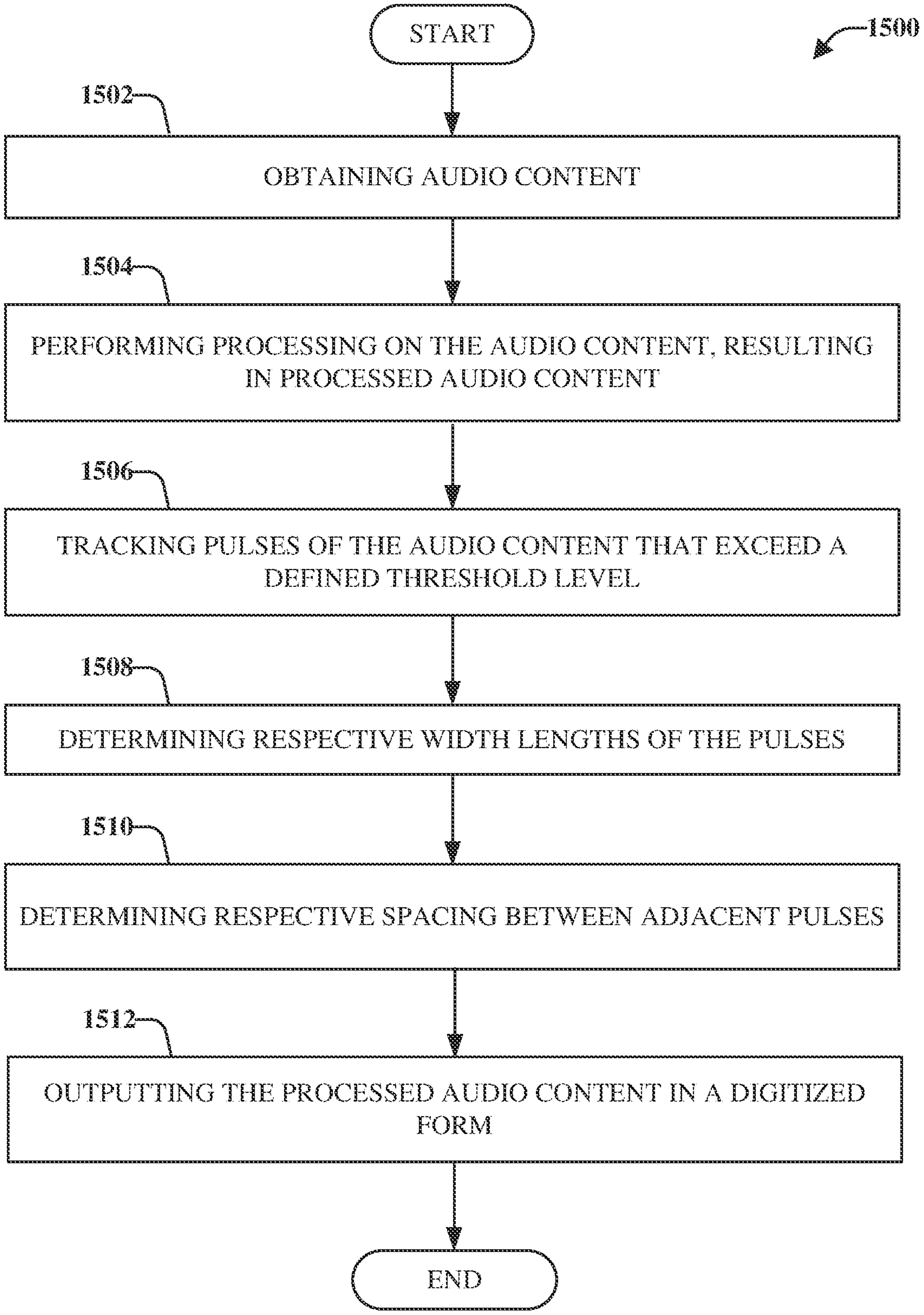
FIG. 15 illustrates a flow diagram of another example, non-limiting, computer-implemented method for processing audio content based on detection of an acoustic activity event of interest in accordance with one or more embodiments described herein.

FIG. 15 illustrates a flow diagram of another example, non-limiting, computer-implemented method 1500 for processing audio content based on detection of an acoustic activity event of interest in accordance with one or more embodiments described herein. The computer-implemented method 1500 can be implemented by a circuit (e.g., the acoustic activity detection circuit 100), by a MEMS sensor, a MEMS microphone, a system including a processor, and so on.

The computer-implemented method 1500 starts at 1502, when audio content is obtained. Processing of the audio content is performed, at 1504, resulting in processed audio content. According to some implementations, performing the processing is implemented on an electromechanical system (MEMS) microphone that obtained the audio content. In some implementations, performing the processing is implemented on a host processor coupled to the output of a MEMS microphone that obtained the audio content.

Processing of the audio content can include tracking pulses of the audio content that exceed a defined threshold level, at 1506. Respective width lengths of the pulses are determined, at 1508, and respective spacing between adjacent pulses are determined, at 1510. Further, at 1512, the processed audio content is output in a digitized form.

According to some implementations, the computer-implemented method 1500 can include determining a number of pulses for a period of time. The number of pulses is indicative of valid audio content. Further, respective width lengths of the pulses are indicative of an amplitude of the audio content. In some implementations, respective spacing between adjacent pulses are indicative of a frequency of the audio content.

As discussed herein, provided is a low power acoustic activity detection circuit with digitized acoustic spectral content output, a low power spectral content capture circuit, and a low power, low complexity, acoustic content classification method. The disclosed aspects allow for frequency and amplitude analysis of acoustic activity at extremely low power and speed. The digital output with acoustic spectral content operates at around 20 μA, for example. The content capture circuit and classification algorithm operate as low as around 25 μA, for example. Classification times as fast as 60 ms for audio content such as a smoke detector, 150 ms for wake word classification can be realized. The smallest algorithm for classification is five lines of code for smoke detector classification, and thirty lines of code for wake word classification. In comparison, existing acoustic activity detect circuits are low power but only provide a go/no-go on acoustic activity, and do not provide spectral content. Complete acoustic activity analysis requires fully turning on a microphone (700 μA) and time to collect additional acoustic data, and turning on a core of a voice processor (hundreds of μAs to one or more milliamps) to complete FFTs on microphone data before analysis can be performed (hundreds of ms to one or more seconds).

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method comprising:

obtaining audio content; and performing processing on the audio content, resulting in processed audio content, wherein the processing comprises:

tracking pulses of the audio content that exceed a defined threshold level, determining respective width lengths of the pulses, determining respective spacing between adjacent pulses, and outputting the processed audio content.

2. The method of claim 1, further comprising determining a number of pulses for a period of time.

3. The method of claim 2, wherein the number of pulses is indicative of valid audio content.

4. The method of claim 2, wherein the period of time is a defined period of time.

5. The method of claim 2, wherein the period of time is a configurable period of time.

6. The method of claim 1, wherein the respective width lengths of the pulses are indicative of an amplitude of the audio content.

7. The method of claim 1, wherein the respective spacing between adjacent pulses are indicative of a frequency of the audio content.

8. The method of claim 1, wherein the performing the processing is implemented on an electromechanical system (MEMS) microphone that obtained the audio content.

9. The method of claim 1, wherein the performing the processing is implemented on a host processor coupled to an output of a MEMS microphone that obtained the audio content.

10. The method of claim 1, further comprising:

prior to the tracking pulses of the audio content, determining that audio content above an average environment noise is to be tracked; and setting the defined threshold level based on the average environment noise.

11. The method of claim 10, wherein the setting comprises adjusting the defined threshold level above a level associated with the average environment noise.

12. The method of claim 10, wherein the average environment noise is determined to be noise associated with a permanent condition.

13. The method of claim 10, wherein the average environment noise is determined to be noise associated with a temporary condition.

14. The method of claim 10, wherein the defined threshold level is a reference voltage level.

* * * * *